UNITED STATES PATENT OFFICE.

SPENCER B. NEWBERRY AND HARVEY N. BARRETT, OF BAYBRIDGE, OHIO.

FERTILIZER AND PROCESS OF MAKING SAME.

995,028.      Specification of Letters Patent.    Patented June 13, 1911.

No Drawing.     Application filed September 30, 1910. Serial No. 584,627.

*To all whom it may concern:*

Be it known that we, SPENCER B. NEWBERRY and HARVEY N. BARRETT, citizens of the United States, residing at Baybridge, in the county of Erie and State of Ohio, have invented a certain new and useful Improvement in Fertilizers and Processes of Making the Same, of which the following is a specification.

Our invention relates to a process by which natural phosphate of lime or phosphate of iron or alumina, known as phosphate rock, or other mineral or animal phosphates in which the phosphoric acid contained is in an insoluble form, may be simply and cheaply converted into a condition in which substantially all the phosphoric acid contained is soluble in ammonium citrate solution, and readily assimilable from the soil in the process of plant growth.

It is well known that the process by which phosphate rock is ordinarily made soluble is by treatment at ordinary temperatures with sulfuric acid in sufficient amount to convert the insoluble tricalcium phosphate of the rock into water-soluble mono-calcium phosphate or so-called superphosphate, according to the equation,

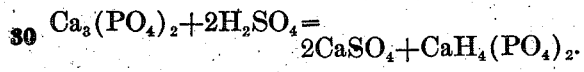

The product, or superphosphate, is a mixture of mono-calcium phosphate with calcium sulfate. Two equivalents of sulfuric acid are required for each equivalent of tri-calcium phosphate. This process presents several well-recognized drawbacks, among which may be mentioned the large amount of sulfuric acid required, the difficulty of drying the product for convenient shipment, the inapplicability of the process to phosphates containing more than a very small percentage of alumina and iron oxid, the tendency of the superphosphate to become again insoluble on storage, and the injurious effect on certain soils of the large amount of sulfate of lime contained in the product. Our experiments have shown that all these drawbacks may be overcome, and a product obtained containing practically no sulfate, in which substantially all the phosphoric acid is in citrate soluble form, by a process consisting of the following steps: 1. Grinding the phosphate to fine powder. 2. Mixing the ground phosphate with an amount of sulfuric acid corresponding approximately to one equivalent of acid to each equivalent of tri-calcium phosphate. 3. Drying and calcining the mixture of ground phosphate and acid, in an oxidizing atmosphere, at a temperature sufficient to more or less completely decompose the calcium sulfate formed, with liberation of sulfur dioxid and oxygen. 4. Grinding the calcined product to powder.

The reactions which take place in the process are believed to be substantially as follows:

1. 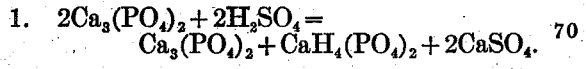

In this operation, which takes place on mixing the acid and ground phosphate, approximately one-half the phosphate is converted to water-soluble acid calcium phosphate, the other half of the raw phosphate remaining unchanged.

2. 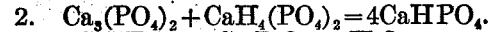
3. 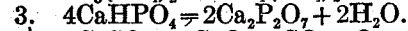
4. 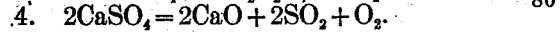

Reactions 2, 3, and 4 take place in the calcination of the mixed phosphate and acid. In this operation the acid calcium phosphate reacts with the unchanged tri-calcium phosphate to form di-calcium phosphate, $CaHPO_4$, which is further decomposed by the heat of calcination to form calcium pyrophosphate, $Ca_2P_2O_7$, with evolution of water. The calcium sulfate formed in reaction one is also, to a large extent, decomposed to lime, with evolution of sulfur dioxid and oxygen. The product of the operation is therefore essentially a mixture or compound of calcium pyro-phosphate and free lime. Prepared as above described it is a dry powder, containing a percentage of citrate-soluble phosphoric acid somewhat higher than that of the total phosphoric acid in the rock treated, and free from tendency to change on storage. It is superior to superphosphate on account of its permanence, practical freedom from sulfates, much higher proportion of soluble phosphoric acid, and greater fertilizing value owing to its more gradual solubility.

As a practical example of the working of our process, we take phosphate rock or mineral phosphate, grind it to fine powder, and mix it, in a suitable vat preferably provided with mechanical stirring apparatus, with an amount of sulfuric acid corresponding approximately to 98 parts pure $H_2SO_4$ to 310 parts tri-calcium phosphate, $Ca_3(PO_4)_2$, contained in the rock. It is economical to use the acid in the form of chamber acid, containing about 60 per cent. pure $H_2SO_4$. If the raw rock contains carbonate of lime, an additional amount of acid, about equal in weight of $H_2SO_4$ to the weight of carbonate present, is used. We do not intend to confine our invention to the use of the proportion of acid above stated, as a considerably greater or less amount may be employed with good results.

An advantageous modification of the process consists in bolting the ground raw phosphate, dissolving the coarser material so separated in the whole quantity of acid to be used, and then adding the finer material to the partially neutralized acid. The acid is quickly absorbed and neutralized. The damp or pasty mass is then introduced into a calcining furnace and subjected to bright orange oxidizing heat, of 2500 degrees to 2800 degrees F., until volatile matters cease to be liberated and the calcined material is brought to a sintered or semi-fused condition. The furnace may be of any suitable type, but best and most economical results are obtained by the use of revolving cylindrical kilns similar in construction and operation to the kilns used in calcining Portland cement.

The acid gases liberated in the calcination may, if objectionable, be condensed by the usual methods.

The calcined product, after cooling, is ground to fine powder and is then ready to be used as fertilizer or as an ingredient of commercial fertilizers.

We claim:

1. The process of making fertilizer by mixing natural phosphate with sulfuric acid and calcining the mixture at high temperature until sulfates are substantially decomposed with liberation of sulfur dioxid and oxygen.

2. The process of converting insoluble phosphates into citrate-soluble form by treating the phosphates with sulfuric acid and calcining the mixture at high temperature until sulfates are substantially decomposed with liberation of sulfur dioxid and oxygen.

3. The process of making fertilizer by grinding natural phosphate, mixing with sulfuric acid, and calcining the mixture at high temperature in an oxidizing atmosphere until sulfates are substantially decomposed with liberation of sulfur dioxid and oxygen.

4. The process of making fertilizer by grinding natural phosphate, mixing with an amount of sulfuric acid corresponding approximately to one equivalent of sulfuric acid to each equivalent of phosphoric acid, $P_2O_5$, contained in the phosphate, calcining the mixture at high temperature until sulfates are substantially decomposed with liberations of sulfur dioxid and oxygen, and grinding the calcined product.

5. The process of making fertilizer by grinding natural phosphate, mixing with an amount of sulfuric acid corresponding approximately to one equivalent of sulfuric acid to each equivalent of phosphoric acid, $P_2O_5$, contained in the phosphate, calcining in an oxidizing atmosphere at a temperature sufficiently high to more or less completely decompose the calcium sulfate formed in the mixture, and grinding the calcined product.

6. A fertilizing material consisting essentially of lime and calcium pyro-phosphate in calcined condition.

7. A fertilizing material consisting essentially of lime and calcium pyro-phosphate in calcined condition, substantially free from sulfates.

SPENCER B. NEWBERRY.
HARVEY N. BARRETT.

Witnesses:
WILLIAM L. TROST,
ALLEN KUBACH.